United States Patent [19]

Speer et al.

[11] Patent Number: 5,035,746

[45] Date of Patent: Jul. 30, 1991

[54] BIEGE-BROWN ENCAPSULATED PIGMENTS AND METHOD OF THEIR PRODUCTION

[75] Inventors: Dietrich Speer, Hanau; Akos Kiss, Wasserlos; Peter Kleinschmit, Hanau, all of Fed. Rep. of Germany

[73] Assignee: Degussa Aktiengesellschaft, Frankfurt, Fed. Rep. of Germany

[21] Appl. No.: 487,148

[22] Filed: Mar. 2, 1990

[30] Foreign Application Priority Data

Mar. 3, 1989 [DE] Fed. Rep. of Germany ....... 3906821

[51] Int. Cl.$^5$ ................................................. C09C 1/62
[52] U.S. Cl. .................................. 106/438; 106/439; 106/450; 427/215
[58] Field of Search ............... 106/438, 450, 439, 456, 106/457; 427/215; 241/23

[56] References Cited

U.S. PATENT DOCUMENTS

| | | | |
|---|---|---|---|
| 3,488,204 | 1/1970 | Jordan et al. | 106/450 |
| 3,847,639 | 11/1974 | Broll et al. | 106/420 |
| 4,482,390 | 11/1984 | Airey et al. | 106/450 |
| 4,788,080 | 11/1988 | Hojo et al. | 427/215 |
| 4,874,433 | 10/1989 | Kiss et al. | 106/450 |

FOREIGN PATENT DOCUMENTS 2312535 5/1972 Fed. Rep. of Germany .

Primary Examiner—Mark L. Bell
Assistant Examiner—Deborah Jones
Attorney, Agent, or Firm—Beveridge, DeGrandi & Weilacher

[57] ABSTRACT

Beige-brown encapsulated pigments are obtained by means of the encapsulation of iron titanates of the formula $Fe_2TiO_5$ in zirconium silicate crystals. The production takes place by calcining a mixture of zirconium oxide with a particle size distribution of $\leq 5$ μm and specific surfaces of $\geq 4$ m$^2$/g, silicon dioxide and iron oxides and titanium oxides or oxide-forming Fe compounds and Ti compounds in the presence of mineralizers under oxidizing conditions at 800° to 1300° C.

13 Claims, No Drawings

BIEGE-BROWN ENCAPSULATED PIGMENTS AND METHOD OF THEIR PRODUCTION

INTRODUCTION AND BACKGROUND

The present invention relates to beige-brown encapsulated pigments based on zirconium silicate as the casing substance into which colored compounds are encased as discrete phases. In a further aspect, the present invention relates to a method of producing these encapsulated pigments.

Encapsulated pigments have become known from the prior art, as for example, DE-PS 23 12 535. They consist of transparent crystals of glaze-stable substances such as e.g. zirconium silicate, zirconium oxide or tin oxide into which inorganic, moisture-free, colored compounds are included or encapsulated, as a discrete phase. Thenard's blue (cobalt blue), titanium yellow and especially cadmium yellow and cadmium red are known as colored compounds. Zirconium iron rose with $Fe_2O_3$ encased in a zirconium silicate casing is also known. The production of these encapsulated pigments takes place by means of heating the casing substances or their precursors and the colored substances to be encapsulated or their precursor in the presence of mineralizers to temperatures up to 1200° C. However, it was found that not all conceivable colored compounds can be encased into the casing substances in an appreciable yield with this method.

The palette of brown colors is not very large. Brown bodies are obtained essentially from iron oxides in combination with other oxides such as e.g. manganese oxide, zinc oxide, nickel oxide or cobalt oxide. Brown encapsulated pigments were not known in the past.

SUMMARY OF THE INVENTION

The present invention therefore had the object of finding beige-brown encapsulated pigments consisting essentially of colorless crystals of zirconium silicate in which there are encapsulated colored compounds as a discrete phase, and further, of developing a method of producing these encapsulated pigments with which a relatively high yield can be achieved.

In achieving the above and other features, the present invention provides beige-brown encapsulated pigments wherein crystalline iron titanates of the composition $Fe_2TiO_5$ are encased as the colored compounds.

These pigments exhibit a beige-brown color. Different color nuances or shades can be the result of different amounts of the encapsulated colored crystallites as well as varying particle form and particle sizes of these crystallites.

The beige-brown encapsulated pigments can be obtained by calcining a previously ground mixture of zirconium oxide, silicon dioxide and precursor compounds of the color-bearing (chromophoric) compounds to be encased in the presence of mineralizers at 800° to 1300° C. The method is characterized in that zirconium oxides with a particle size distribution (D50 value) of preferably equal to or less than 5 µm and a specific surface area of equal to or greater than 4 $m^2/g$ are used and iron oxides and titanium oxides or iron compounds and titanium compounds which form oxides at elevated temperatures under oxidizing conditions are used as precursors of the color-bearing compound to be encapsulated. The compressed mixture is then calcined under oxidizing conditions 0.5 to 8 hours.

Either oxides such as e.g. $FeO$, $Fe_2O_3$, $Fe_3O_4$, and $TiO_2$ are used as iron compounds and titanium compounds or compounds are used which form oxides at rather high temperatures under oxidizing conditions such as e.g. titanyl compounds. The oxides or their precursors are selected according to the knowledge of the art so that under the conditions used herein the desired $Fe_2TiO_5$ will be formed. In principle, iron titanates per se; that is, of the formula $Fe_2TiO_5$ can also be used in as far as they are available in a sufficient fineness. The mineralizers used are usually alkali metal or alkaline earth metal halogenides, preferably alkali metal fluorides or alkaline earth metal fluorides and alkali silicofluorides. Mixtures of mineralizers can be used.

In this manner, beige-brown encapsulated pigments are obtained which contain $Fe_2TiO_5$ inclusions, as can be demonstrated by x-ray diffraction and with a scanning electron microscope. The yields of utilizable pigments are in the range of 90 % and higher. The average particle size of the encapsulated pigment product is preferably in a range of 5 to 10 µm. The color-bearing $Fe_2TiO_5$ inclusions, totally surrounded by the $ZrSiO_4$ crystal casing, exhibit a considerably lesser particle size - generally below 1 µm.

It is preferable to use iron oxides ($Fe_2O_3$) which are as fine as possible. Commercially available iron-(III)-oxides with D50 values of 0.2 to 0.7 µm and specific surfaces of 13 to 24 $m^2/g$ (determined as in the case of $ZrO_2$ geometrically from the particle distribution) are good to use. Titanium dioxide is preferably used as the titanium compound, which is preferred to be as fine as possible, namely under 1 µm. It is particularly advantageous if pyrogenic titanium oxides are used, especially consisting of a mixture of anatase and rutile with at least 20 % by weight rutile component; pyrogenic $TiO_2$ often exhibits a primary particle size of 20 to 30 nm, depending on the method used for production.

Zirconium oxide and silicon dioxide are used in essentially equivalent amounts. The mixture to be calcined is ground prior to the calcining process, e.g. in a ball mill or in other intensive grinding mills. The calcining can take place in customary furnaces such as e.g. in piston furnaces (furnace for getting the product to be calcined heated up within the shortest time), chamber furnaces or tunnel furnaces. Such furnaces are well known as are the compression conditions. Even though it has proven to be very advantageous when the rate of heating during heating up the mixture to the calcination temperature is 400° to 750° C./hour, preferably 450° to 550° C./hour, the rate of heating can also be outside of these limits. At a calcination temperature in the preferred range of 1000° to 1200° C, a calcining time in the range of approximately 1 hour to 2 hours is usually sufficient.

The new, beige-brown encapsulated pigments are suitable for the pigmentation of glazes. By comparison, iron titanates which are not encased dissolve during the formation of glass.

DETAILED EMBODIMENTS OF THE INVENTION

The following examples are intended to explain the method of the invention in more detail:

EXAMPLE 1

A mixture consisting of 25 g zirconium oxide (D50 value=3.9 µm; specific surface=5.2 $m^2/g$), 13.5 g silicon dioxide, 3.5 g potassium chloride, 2.5 g magnesium fluoride, 1.5 g sodium hexafluorosilicate, 5 g iron-(III)- oxide and 2.5 g titanium dioxide is heated after a 30-minute grinding at a heating rate of 500° C./hour to 1100° and calcined there in the presence of air for 1 hour. A beige-brown product is produced which consists of $Fe_2TiO_5$ crystals encased in zirconium silicate. Yield 94 %.

EXAMPLE 2

A mixture as in example 1, where the zirconium oxide exhibits a D50 value of 3.4 μm and a specific surface of 6 m²/g, is heated at 600° C./hour to 1200° C. and calcined for 1 hour. A beige-brown product is likewise obtained. Yield 90 %.

Further variations and modifications of the foregoing will be apparent to those skilled in the art and are intended to be encompassed by the claims appended hereto.

We claim:

1. Beige-brown encapsulated pigments consisting essentially of transparent crystals of zirconium silicate in which there is included, as a discrete phase within said zirconium silicate, crystalline iron titanate of the composition $Fe_2TiO_5$ as a colored compound.

2. Beige-brown encapsulated pigments according to claim 1 having an average particle size of 5 to 10 μm.

3. A method of producing a beige-brown encapsulated pigment comprising calcining a previously ground mixture of zirconium oxide, silicon dioxide and precursor compounds of a color-bearing, chromophoric compound to be encapsulated in the presence of a mineralizer at 800° to 1300° C., the zirconium oxides having a particle size distribution (D50 value) of equal to or less than 5 μm and a specific surface of equal to or greater than 4 m²/g, said precursors being at least one iron oxide and at least one oxide of titanium or, an iron compound and a titanium compound which form oxides under elevated temperature with oxidizing conditions, calcining being carried out under oxidizing conditions for 0.5 to 8 hours.

4. The method according to claim 3, wherein fine iron oxides ($Fe_2O_3$) with D50 values between 0.2 and 0.7 μm and a specific surface between 13 and 24 m²/g are used.

5. The method according to claim 3, wherein pyrogenic titanium oxide consisting of anatase and rutile with at least 20 % by weight rutile component is used.

6. The method according to claim 3, wherein said mixture is brought to the calcining temperature at a heating rate of 400° to 750° C./hour.

7. The method according to claim 3, wherein the mineralizer is a member selected from the group consisting of alkali metal halogenides, alkaline earth metal halogenides and alkali metal silicofluorides.

8. The method according to claim 5, wherein the primary particle size of the titanium oxide is 20 to 30 nm.

9. The method according to claim 3, wherein a mixture of different mineralizers is used.

10. A method of producing a beige-brown encapsulated pigment comprising grinding zirconium oxide, silicon dioxide and at least one iron oxide and at least one titanium oxide, precursors thereof, or $Fe_2TiO_5$, forming a ground mixture thereof, calcining at a temperature of 800° to 1300° C. to thereby form transparent crystals of zirconium silicate in which there is included, as a discrete phase within said zirconium silicate, crystalline iron titanate of the formula $Fe_2TiO_5$ as a colored compound in high yield, said zirconium oxide having a particle size of (D50) equal to or less than 5 μm and a specific surface equal to or greater than 4 m²/g.

11. The method according to claim 11, wherein the yield is at least 90%.

12. The method according to claim 11, wherein the duration of calcination is 0.5 to 8 hours.

13. The method according to claim 11, wherein a heating rate of 400° to 750° C. per hour is used.

* * * * *